United States Patent
Reece et al.

(10) Patent No.: US 10,990,721 B1
(45) Date of Patent: Apr. 27, 2021

(54) DELAY DEPENDENCE IN PHYSICALLY AWARE CELL CLONING

(71) Applicant: Cadence Design Systems, Inc., San Jose, CA (US)

(72) Inventors: William Robert Reece, Over (GB); Thomas Andrew Newton, Great Cambourne (GB); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/718,018

(22) Filed: Dec. 17, 2019

(51) Int. Cl.
*G06F 30/33* (2020.01)
*G06F 30/31* (2020.01)
*G06F 30/398* (2020.01)

(52) U.S. Cl.
CPC ............ *G06F 30/31* (2020.01); *G06F 30/398* (2020.01)

(58) Field of Classification Search
CPC ...... G06F 30/39; G06F 30/392; G06F 30/394; G06F 30/396; G06F 1/10; G06F 30/327; G06F 30/331; G06F 1/32; G06F 1/3287; G06F 2119/12; G06F 30/30; G06F 30/34; G06F 30/3312; G06F 30/333; G06F 30/398; G06F 30/00; G06F 17/11; G06F 2115/08; G06F 3/0482; G06F 3/04842; G06F 3/04847; G06F 30/35; G06F 30/367; G06F 1/06; G06F 2119/06; G06F 30/337; G06F 30/347; H01L 27/0207; H01L 23/50; H01L 2224/48227; H05K 2201/10212; H05K 1/185; H05K 2201/10674; H05K 1/029; H03K 19/0016; H03K 19/17736; H03K 19/17728; H03K 19/1774; H03K 19/17748; H03K 19/17796; H03L 7/00
USPC ................................................ 716/100–108
See application file for complete search history.

(56) References Cited

U.S. PATENT DOCUMENTS

| | | | |
|---|---|---|---|
| 2006/0190899 A1* | 8/2006 | Migatz | G06F 1/10 716/114 |
| 2013/0194016 A1* | 8/2013 | Wimer | H03K 19/0016 327/199 |
| 2017/0228485 A1* | 8/2017 | Xu | G06F 30/34 |

* cited by examiner

*Primary Examiner* — Binh C Tat
(74) *Attorney, Agent, or Firm* — Schwegman Lundberg & Woessner, P.A.

(57) ABSTRACT

Electronic design automation systems, methods, and media are presented for cell cloning during circuit design. In one embodiment, for a circuit design comprising a plurality of flip-flop elements having clock inputs provided by a routing tree, a delay is identified for each flip-flop element. The flip-flop elements are clustered by delay to generate at least two clusters of flip-flop elements. Elements within the clusters are then grouped by physical characteristics to generate delay groups of flip-flop elements. An updated routing tree is then generated for the circuit design using the first delay group and the second delay group.

20 Claims, 11 Drawing Sheets

```
                ┌────────────────────────────────────────────────────────────┐
                │ ACCESSING A CIRCUIT DESIGN STORED IN MEMORY, THE CIRCUIT   │
          502   │ DESIGN COMPRISING A PLURALITY OF FLIP-FLOP ELEMENTS        │
                │ HAVING CLOCK INPUTS PROVIDED BY A ROUTING TREE             │
                └────────────────────────────────────────────────────────────┘
                                              │
                                              ▼
                ┌────────────────────────────────────────────────────────────┐
          504   │ IDENTIFYING AN ASSOCIATED DELAY FOR EACH FLIP-FLOP         │
                │ ELEMENT OF THE PLURALITY OF FLIP-FLOP ELEMENTS             │
                └────────────────────────────────────────────────────────────┘
                                              │
                                              ▼
                ┌────────────────────────────────────────────────────────────┐
                │ CLUSTERING THE PLURALITY OF FLIP-FLOP ELEMENTS BY THE      │
                │ ASSOCIATED DELAY TO GENERATE AT LEAST A FIRST CLUSTER OF   │
          506   │ FLIP-FLOP ELEMENTS AND A SECOND CLUSTER OF FLIP-FLOP       │
                │ ELEMENTS                                                   │
                └────────────────────────────────────────────────────────────┘
                                              │
                                              ▼
                ┌────────────────────────────────────────────────────────────┐
                │ GROUPING FLIP-FLOP ELEMENTS WITHIN THE FIRST CLUSTER BY    │
                │ PHYSICAL CHARACTERISTICS TO GENERATE AT LEAST A FIRST      │
          508   │ DELAY GROUP OF FLIP-FLOP ELEMENTS WITHIN THE FIRST         │
                │ CLUSTER AND A SECOND DELAY GROUP OF FLIP-FLOP ELEMENTS     │
                │ WITHIN THE FIRST CLUSTER                                   │
                └────────────────────────────────────────────────────────────┘
                                              │
                                              ▼
                ┌────────────────────────────────────────────────────────────┐
                │ GENERATING AN UPDATED ROUTING TREE FOR THE CIRCUIT         │
          510   │ DESIGN USING THE FIRST DELAY GROUP AND THE SECOND DELAY    │
                │ GROUP                                                      │
                └────────────────────────────────────────────────────────────┘
```

*FIG. 5*

DELAY DEPENDENCE IN PHYSICALLY AWARE CELL CLONING

TECHNICAL FIELD

Embodiments described herein relate to electronic design automation (EDA), and to systems, methods, devices, and instructions to perform cell cloning as part of design, verification, and generation of circuit designs.

BACKGROUND

Electronic design automation (EDA) is a category of systems for assisting with the design of electronic systems and devices. Large, integrated circuit designs are often assembled from previously designed blocks or generic designs which may include various combinations of elements. This enables reduced turnaround times for generation of an integrated circuit. Cells are blocks within a design that can be replicated. Schematic and layout information for such block portions of a design may be exchanged or licensed as intellectual property. During design of a specific circuit, large numbers of combinations of different variables that go into a design may require significant resources to verify that all acceptable combinations will function properly.

BRIEF DESCRIPTION OF THE DRAWINGS

Various ones of the appended drawings merely illustrate example embodiments of the present disclosure and should not be considered as limiting its scope.

FIG. 5 describes a method of delay dependent physically aware cell cloning in accordance with some embodiments.

DETAILED DESCRIPTION

Figure 1:
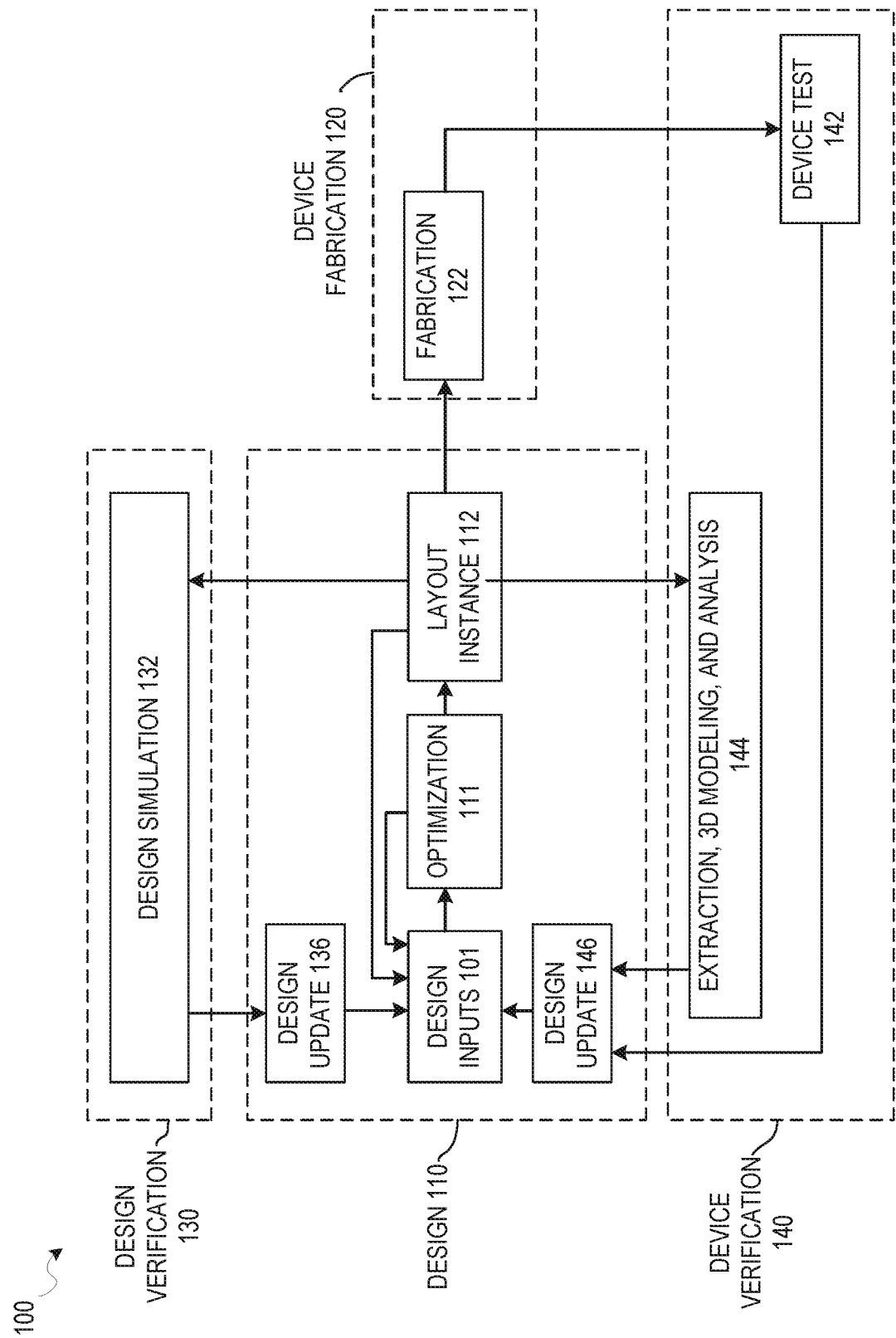
FIG. 1 is a diagram illustrating one possible design process flow for generating a circuit including embodiments to meet timing constraints according to some embodiments.

Embodiments described herein relate to EDA and to methods, computer media, and devices used for analyzing, optimizing, and creating electronic circuits. One of the many complex elements of circuit design is the generation of routing trees that convey a signal from a signal origin, or source, to a signal destination, or sink. While physical characteristics (e.g. proximity) between sinks is one mechanism for grouping cells within a tree, embodiments described herein use additional dependencies in addition to physical characteristics for grouping sinks to create cell clones within a tree.

A clock tree, for example, has a clock source and can be attached to hundreds or thousands of destination sinks. Clock gating is a technique used in many synchronous circuits for reducing dynamic power dissipation by adding logic to a circuit to prune the clock tree. This disables portions of the clock circuitry so that the flip-flop elements in them do not have to switch states, thus reducing power usage. Integrated clock gate (ICG) cells that perform this gating, however, are limited in the number of flip-flop elements that can be driven by a single cell. Cell cloning can be used to group ICG cells within a clock tree. Cell cloning as described herein can be referred to as hybrid cell cloning, because the logical structure is cloned, without the exact physical structure necessarily being cloned. For example, physical sizing can vary within the cells to fine tune delays within a tree structure, so that different cloned cells are physically distinct.

As part of such cell cloning, design rule violations (DRV) are considered. Many other different DRV constraints will impact cell cloning as described herein including clock transition and timing constraints. Clock transition constraints are limits on the time a clock signal takes to switch between high and low states, and can be referred to as transition time or slew time constraints. While buffers can be used in some situations to meet timing constraints, in some systems, buffering is disabled or are limited to meet delay constraints (e.g. in high performance chips with high clock frequency where low clock latency constraints are part of the circuit design constraints). Some embodiments described herein can meet multiple DRVs, including fanout, transition, and delay constraints, using delay dependence with physically aware cell cloning. For example, an initial design can include a clock tree with 10,000 flip-flop elements and an ICG assigned to drive these flops, but a DRV that limits each ICG cell to driving 50 flip-flop elements. Cell cloning can be used to place at least 200 ICG cells within the design, with each ICG cell attached to no more than 50 flip-flop elements. A physically aware design without other dependencies would simply assign 50 flip-flop elements to each ICG cell based on physical grouping, but this can result in an unfixable skew within the fanout for a single cell (e.g. when certain elements have different pin insertion delay (PID)) and timing errors which violate design rules. Embodiments described herein first cluster elements by a dependent value (e.g. delay), and then use physically aware grouping for each dependent value cluster.

For example, in one embodiments delay windows for clustering can be identified (e.g. a first window of −20 picoseconds (ps) to less than 0 ps, a second window of 0 ps to less than 20 ps, and a third window of greater than 20 ps). Elements for an initial tree (e.g. 1000 flip-flop elements) are clustered according to these windows. Then physically aware grouping is used within each cluster. For example, if in a tree with 10000 flip-flop elements 3000 flip-flop elements are within the first window cluster, then those 3000 elements will be grouped via physically aware cell cloning (e.g. placed within an ICG cell fanout to meet DRVs based on physical proximity), with the other 7000 elements treated separately based on their separate delay clustering.

Such embodiments improve a circuit design by meeting DRV constraints (e.g. delay and skew rules) without additional elements (e.g. buffers or sizing offsets) which use design resources (e.g. additional space or power resources). Embodiments thus improve circuit designs by meeting improving timing performance in systems which do not use mesh or buffer elements to manage delay in a routing tree. Embodiments can also enable fine balancing with hybrid clone cell sizing, which can improve total power performance and total negative slack. Additionally, some embodiments can improve the performance of a design by using ICG cells clustered by dependencies while avoiding the additional delays added by buffers. For example, as described above, delays added by buffer circuits to address one DRV can cause other DRVs, particularly for high performance circuits. Embodiments herein can balance branches without such increases by clustering based on the delays and without using buffers. This can particularly occur when buffering use is disabled (e.g. due to multi-supply voltage constraints or high performance designs where clock latency is to be minimized).

Such use of dependency values in hybrid cloning can function to provide improved flexibility in other aspects of a design by addressing the dependency (e.g. delay) via clustering of hybrid clones to separate design problems and allow the separate design problems to be solved independently within their separate clusters (e.g. by provided a similar delay within the fanout of clones of a certain cluster). This can occur with decreased clock skew and a small amount of useful skew offset used in the design to solve various design issues, particularly in high performance designs, which can lead to large improvements in total negative slack and power performance.

Additionally, while embodiments are primarily described herein within the context of clock trees and gating, other embodiments will be apparent. For example, in multi-supply voltage circuit designs with a level shifter tree, level dependence can be used in conjunction with physically aware level shifter cloning in accordance with embodiments described herein.

FIG. 1 is a diagram illustrating one possible design process flow which includes elements for cell cloning within a routing tree synthesis as part of a circuit design process flow. It will be apparent that other design flow operations can function using the hybrid cell cloning optimizations described herein, but design flow 100 is described here for the purposes of illustration. As illustrated, the overall design flow 100 includes a design phase 110, a device fabrication phase 120, a design verification phase 130, and a device verification phase 140. The design phase 110 involves an initial design input operation 101 where the basic elements and functionality of a device are determined, as well as revisions based on various analyses and optimization of a circuit design. This design input operation 101 is where initial layouts for a clock tree structure and sinks are generated, before adjustments are made to ensure that timing requirements for each sink are met. The initial strategy, tactics, and context for the device to be created are also generated in the design input operation 101, depending on the particular design algorithm to be used.

In some embodiments, following an initial selection of design values in design input operation 101, a routing tree may be generated, in accordance with various embodiments described herein, during optimization operation 111 or layout instance 112, along with any other automated design processes. As described below, design constraints for a routing tree structure and sinks which receive a signal from the routing tree structure may be initiated with design inputs in design input operation 101, and then may be analyzed and optimized using timing analysis according to various embodiments. While design flow 100 shows such optimization occurring prior to layout instance 112, updates to a routing tree may be performed at any time to improve expected operation of a circuit design. For example, in various embodiments, constraints for blocks in a circuit design may be generated prior to routing of connections in a circuit design, after routing, during register transfer level (RTL) operations, or as part of a final signoff optimization or verification prior to a device fabrication operation 122. Certain embodiments of operations described herein for generating or updating a routing tree structure may therefore involve iterations of design input operation 101, optimization operation 111, and layout instance 112 generation. In other systems, other design processes may be used.

After design inputs are used in design input operation 101 to generate a circuit layout, and any optimization operations 111 are performed, a layout is generated in layout instance 112. The layout describes the physical layout dimensions of the device that match the design inputs. This layout may then be used in a device fabrication operation 122 to generate a device, or additional testing and design updates may be performed using designer inputs or automated updates based on the design simulation 132 operations or extraction, 3D (three-dimensional) modeling, and analysis 144 operations. Once the device is generated, the device can be tested as part of device test 142 operations, and layout modifications generated based on actual device performance.

Design updates 136 from design simulation 132, design updates 146 from device test 142 or extraction, 3D modeling, and analysis 144 operations, or direct design input operation 101 may occur after an initial layout instance 112 is generated. In various embodiments, whenever design inputs are used to update or change an aspect of a circuit design, a timing analysis and optimization operation 111 may be performed.

Figure 2A:
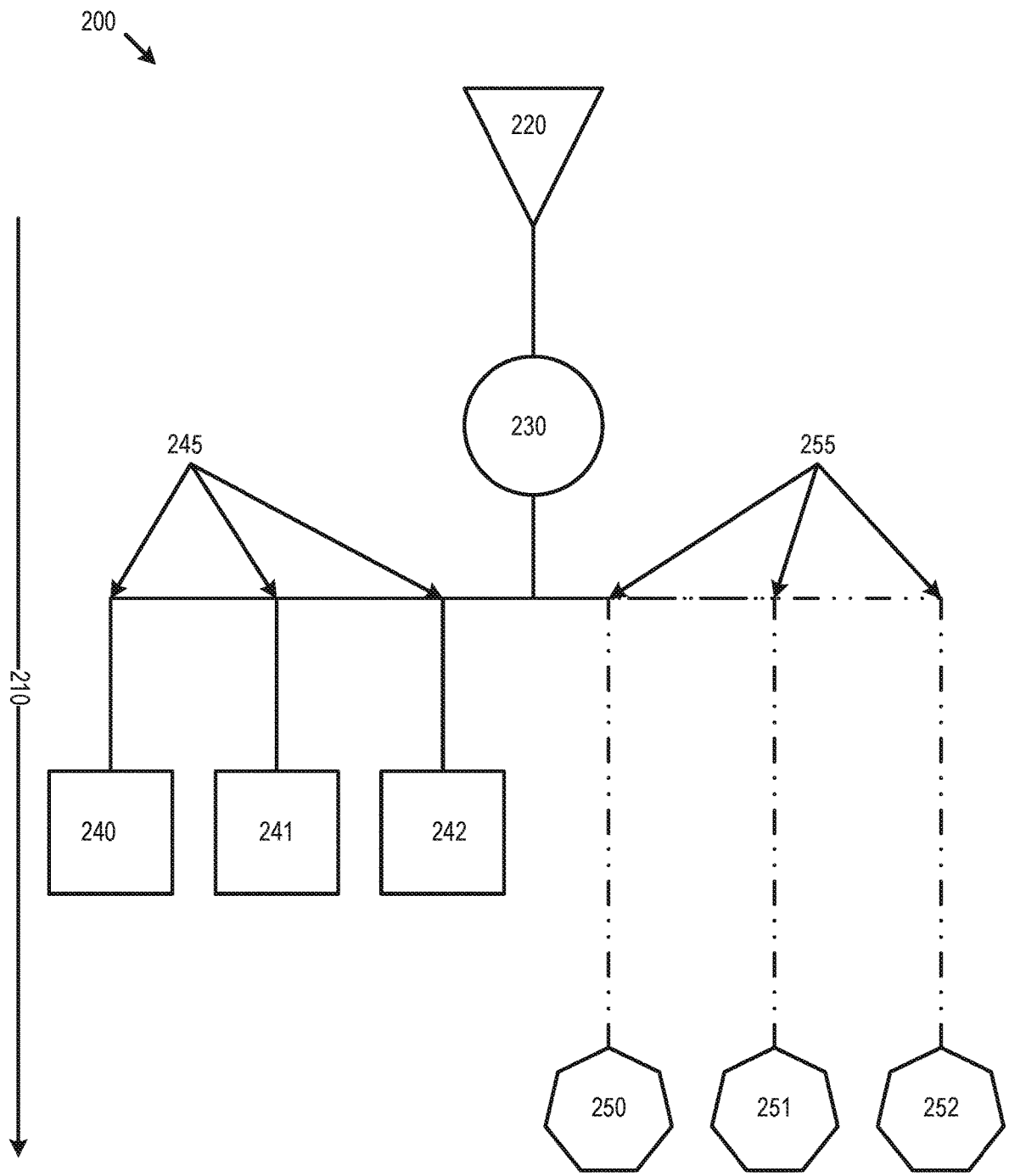
FIG. 2A illustrates a timing view of a simple routing tree in accordance with some embodiments.

FIG. 2A illustrates a timing view 200 of a simple routing tree in accordance with some embodiments. At various points in a design flow 100, routing trees can be synthesized for various functions in a circuit design. For example, clock tree synthesis (CTS) designs the tree which provides a clock to elements of a synchronized circuit. As described above, ICG cells can be used to improve the performance of a circuit using flip-flop elements connected to a clock tree. An initial design of such a clock tree can include definitions for a source 220, a single ICG cell 230, and flip-flop elements 240-242 and 250-252, with timing values 210 defining a delay from the source 220 to each sink within the tree (e.g. flip-flop elements 240-242 and 250-252). As illustrated, flip-flop elements 240, 242, and 242 have similar delay 245 values, and flip-flop elements 250, 251, and 252 have similar delay 255 values which are different than the delay 245 values. This can, in some embodiments, be caused by pin insertion delay (PID) of flip-flop elements 250, 251, and 252, transitive subtree delay, or other insertion delay sources within a circuit design.

Additionally, a circuit design associated with timing view 200 can have various design rules. A design flow 100 can include EDA operations to identify design rule violations (DRVs) and to EDA modifications to a circuit design to correct such DRVs. For example, one design rule can limit the number of flip-flop elements connected to (e.g. within a fanout below) a single ICG circuit. Another design rule can limit the skew between flip-flop elements connected to a single ICG circuit, or the maximum clock transition time. When an initial design identifies an ICG cell without assigning an ICG circuit to the appropriate number of flip-flop elements, CTS operations generate "clones" of the ICG circuit in order to correct DRVs associated with having an excess number of flip-flop elements assigned to a single ICG cell.

The assignment of fanout to each clone is important, as the fanout (e.g. sink elements) will be relatively physically close otherwise the cell clone will not satisfy all DRV constraints. This is known as a clustering problem and many solutions to it exist. The most common example of a clustering algorithm is the K-means algorithm. For a given number of clusters, K, the algorithm will iteratively find the best sink assignment and the centers of each cluster of sinks. By scanning over K clusters until all clusters can drive their fanout, a design includes a clustering solution that satisfies the design constraints. The K-means algorithm is purely geometric so that fanout are more likely to be clustered together if they are physically close. The result is an optimal number of clusters with the driver of each cluster (e.g. an ICG cell clone) positioned so that it is grouped with its fanout. The cell being cloned does not have to be an ICG. Embodiments described herein apply to any similar routing tree with cloned cells.

In addition to a clock tree with ICG clone cells, embodiments described herein also apply to MSV designs where the level shifter cloning can be used. When EDA operations are used for cloning ICGs, a designer is attempting create a high-performance, low latency tree, while a level shifter is motivated by electrical considerations. In a circuit design with two power domains having different supply voltages, a circuit design can be modified to insert a level shifter at any points where path crosses between the two domains. In circuit designs where a buffer is not able to be inserted in a destination power domain, but a level shifter is not able to drive a fanout while meeting DRV constraints, then cell cloning as described herein can be used with a level shifter to meet the DRV constraints.

Figure 2B:
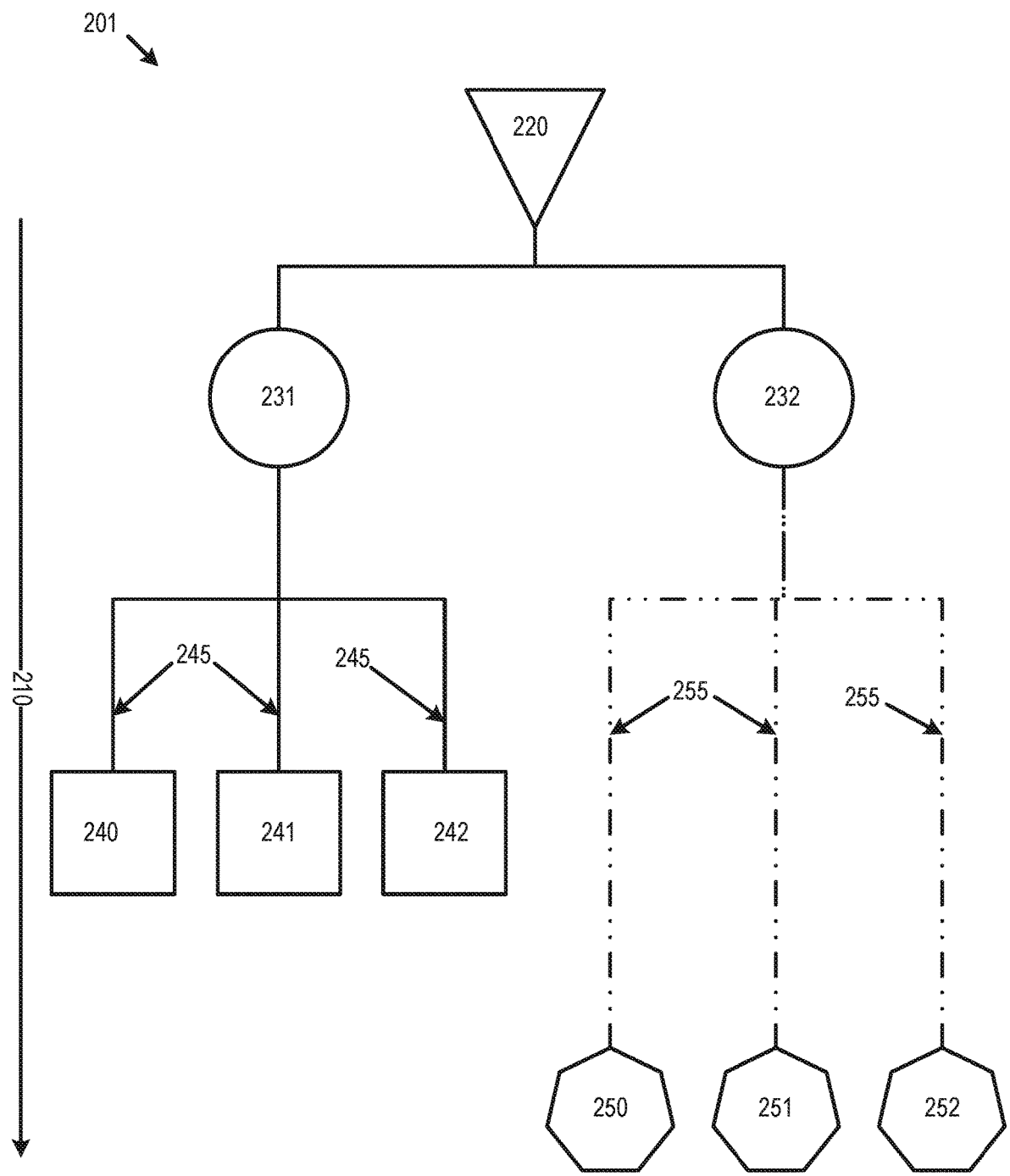
FIG. 2B illustrates a timing view of a simple routing tree with a delay dependent cloned cell in accordance with some embodiments.

FIG. 2B illustrates a timing view 201 of a simple routing tree derived from an initial routing tree from FIG. 2A with FIG. 2B showing with a delay dependent cloned cell in accordance with some embodiments. In FIG. 2B, the ICG cell 230 of FIG. 2A is replaced with hybrid cloned ICG cells 231 and 232. If the delay to all fanouts (e.g. flip-flop elements 240-242 in a first fanout and flip flop elements 250-252 in a second fanout) is the same, then a purely physical partitioning is adequate to produce a balanced tree. However, if the delay to the individual fanout is very different and shown in FIG. 2B, as can be common in flows that employ useful skew, then assigning two fanout with very different delays to the same clone can result in unfixable clock skew below the ICG and so poor timing results. In order to prevent such unfixable clock skew within a fanout of an individual cloned cell (e.g. ICG cells 231 and 232), the flip-flop elements are first grouped by delay. In the simple example of FIG. 2B, each grouping of flip flop elements by delay can be driven by a single cloned cell. If more elements are present within a timing group than can be driven by a single ICG cell, then the flip-flop elements with similar delays can be grouped by physical proximity or other physical values, and assigned to an ICG cell by physical proximity as well as by location.

Embodiments described herein thus operate to split the clustering problem for a routing tree into multiple sub-problems and then apply clustering separately to each sub-problem in turn in a nested fashion. This can, in some embodiments, to increase the number of cell clones but can decrease the overall power usage due to timing improvements. As described above, this can particularly provide improvements where buffering is disabled to prevent delay increases to reduce skew, and in related high-performance circuit designs. FIGS. 2A and 2B illustrate a simple design with few flip-flop elements. In an example 10000 flip-flop elements being driven by a single ICG circuit in an initial design, the delay dependent physically aware cell cloning process provides a more realistic example. In one embodiment, some of the timing paths related to these flip-flop elements include useful skew so that the clock signal to a given flip-flop element is designed to either be delayed or brought early (e.g. for selected PIDs as described above). Such flip-flop elements that require a delay can be annotated with a negative offset (e.g. negative 20 picoseconds (ps)) while those that are configured to receive the clock signal early will get a positive offset (e.g. positive 20 ps). The goal of CTS in such a system is to design a routing tree that makes the delay to all clock end points approximately equal and so useful skew can be implemented by taking account of these offsets when calculating the clock latency during optimization. If 1000 of the flip-flop elements have an offset of –20 ps, 2000 have an offset of +20 ps and the rest have no offset, then during CTS if a flop with a 20 ps offset is clustered with a flop without an offset, the minimum measured skew beneath the clone will be 20 ps and the specified useful skew will not be implemented. To avoid this situation, a system can define a delay window and partition the flip-flop elements into clustering sub-problems. If the calculated delay window was 19 ps, then the implementation would partition the flip-flop elements by delay in 19 ps clusters. Then within each grouping by delay window, the clusters in the individual groupings can be sub-grouped by physical location. All the flip-flop elements with offsets of –20 ps would be clustered together, as would the flops with no offsets and those with a +20 ps offset. If some flops had a smaller difference (e.g. some with a +22 ps offset and some with a +21 ps offset), these would still be clustered together in this example. FIG. 2B illustrates a simplified example of this, with the two sub-groups separated by timing differences (e.g. flip-flop elements 240-242 in a first group and flip-flop elements 250-252 in a second group) with no physical sub-grouping since each delay group is driven by a single clone (e.g. cell clones 231 and 232).

Figure 3A:
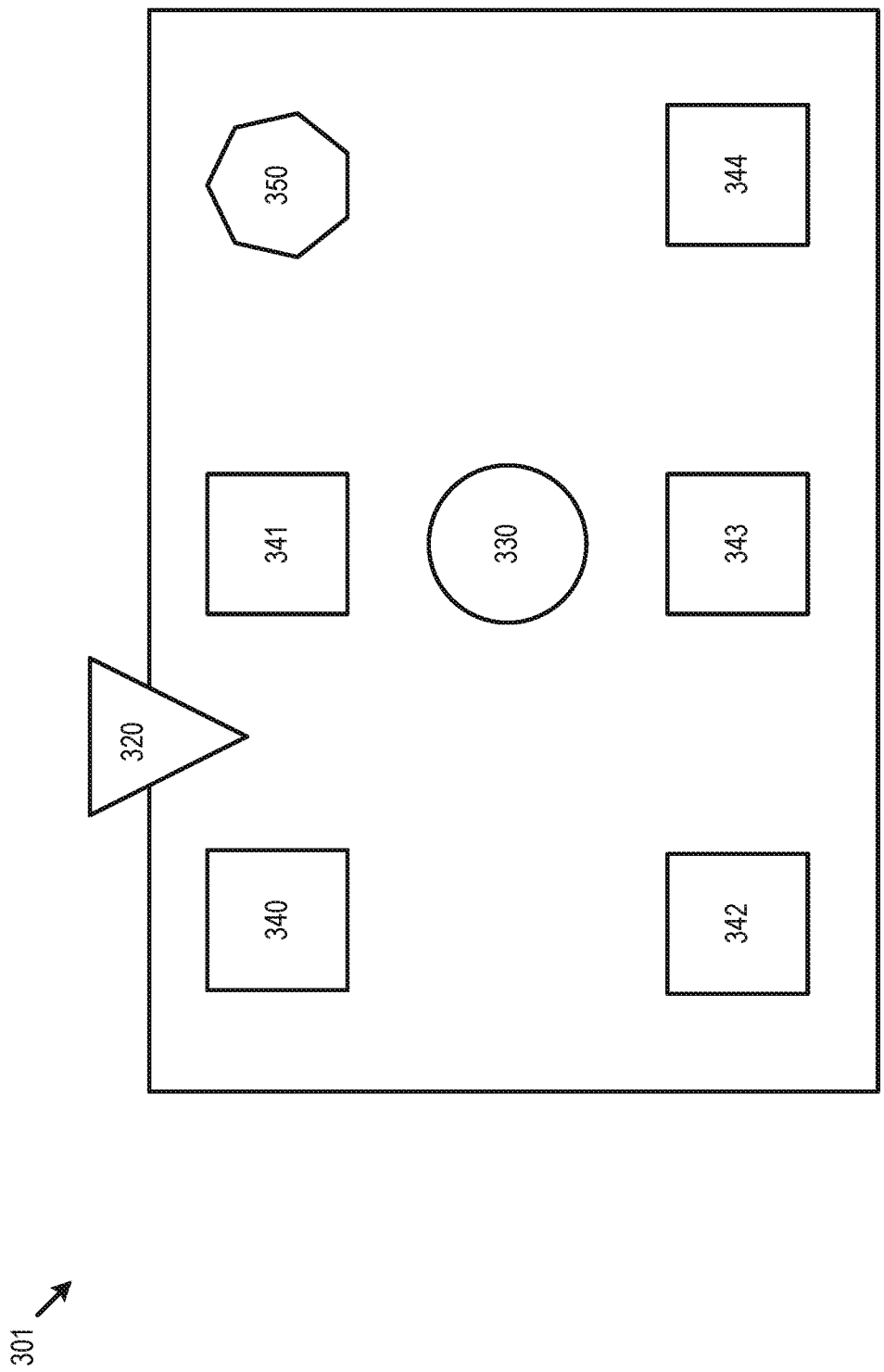
FIG. 3A illustrates a physical view of a simple routing tree in accordance with some embodiments.
Figure 3B:
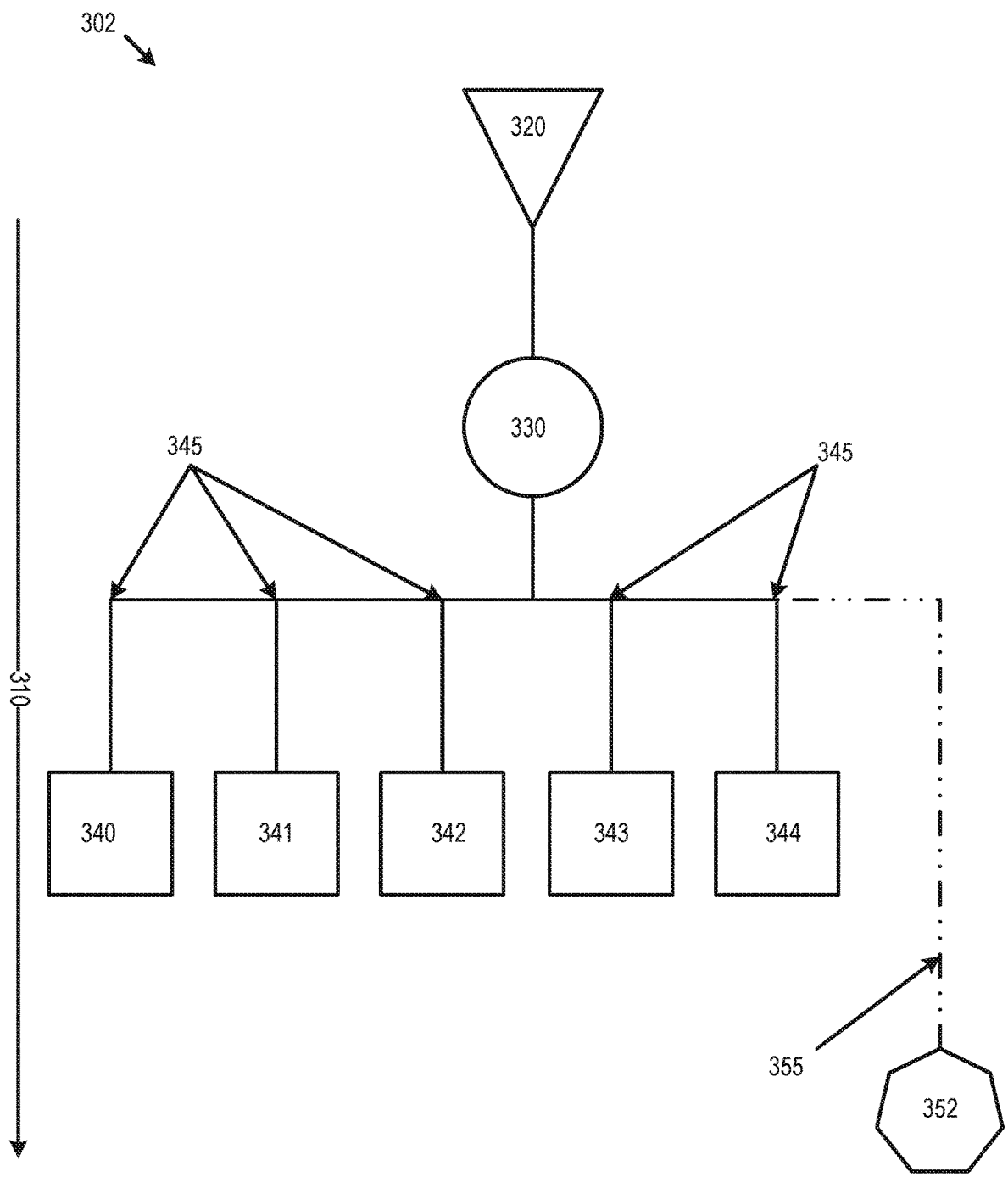
FIG. 3B illustrates a timing view of a simple routing tree in accordance with some embodiments.
Figure 3C:
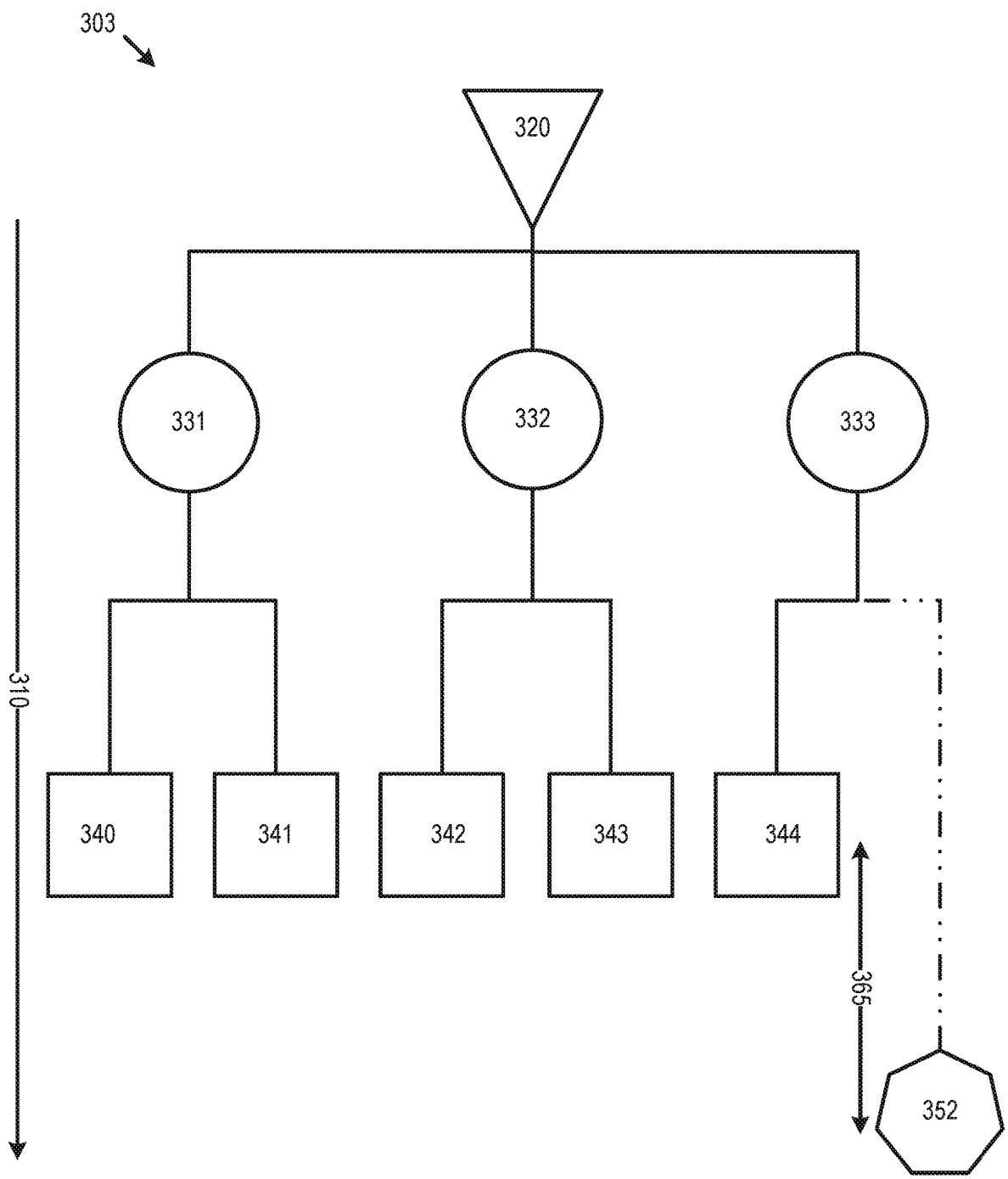
FIG. 3C illustrates a timing view of a simple routing tree with cloned cell in accordance with some embodiments.
Figure 3D:
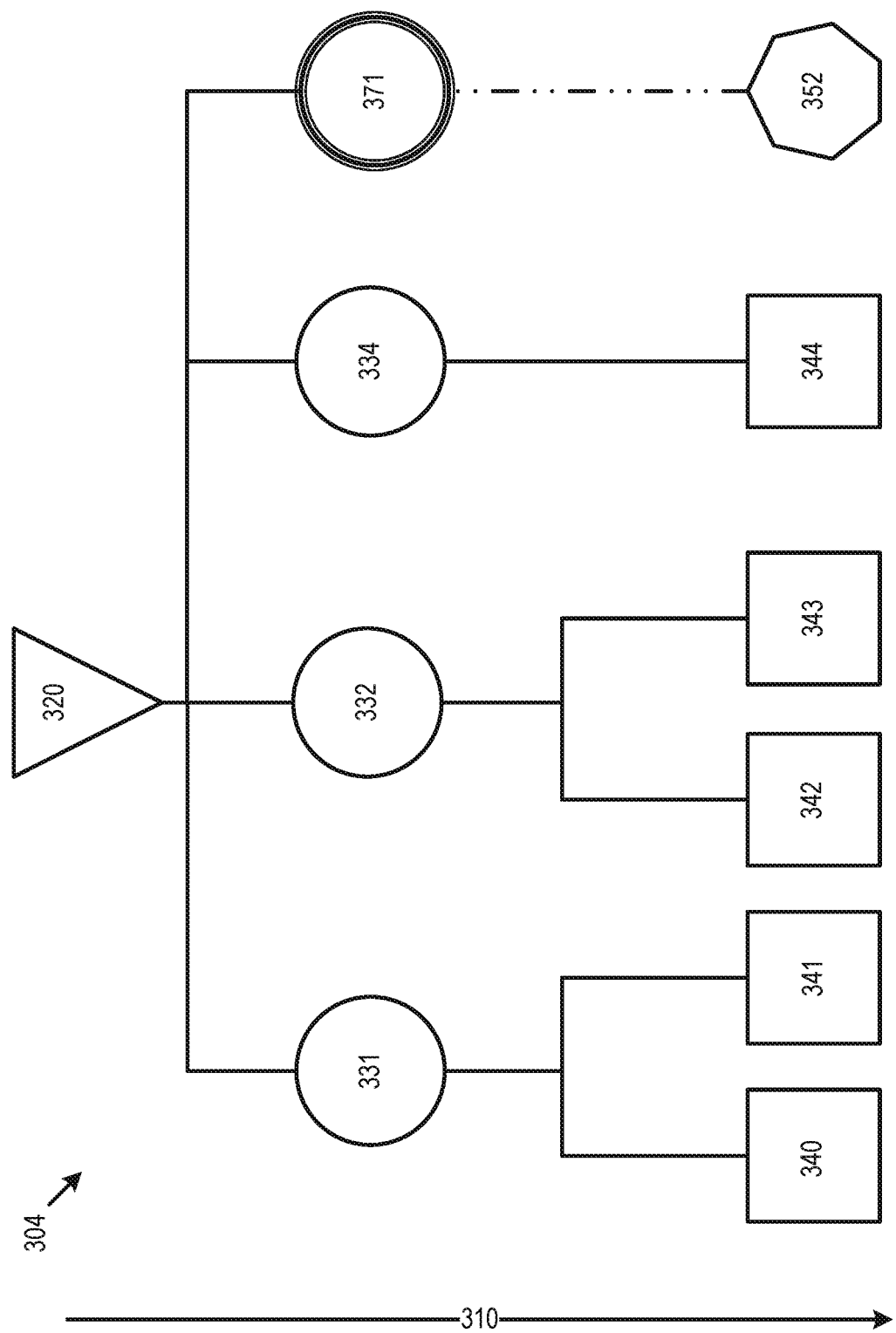
FIG. 3D illustrates a timing view of a simple routing tree with a delay dependent cloned cell in accordance with some embodiments.

FIGS. 3A-D then describe an additional example, with an embodiment further involving delay tuning by adjusting each ICG cell clone to modify the delay of some fanouts and reduce skew between fanouts. FIG. 3A illustrates a physical view 301 of a simple routing tree in accordance with some embodiments. Physical view 301 illustrates an initial circuit design with a source 320, sinks 340-344 and 350, and a cell 330. The circuit design described by view 301 includes a limitation against using buffers to, and a limit of two sinks per cell 330. FIG. 3B illustrates a timing view 302 of a simple routing tree with delays 310 measured from sink 320 in accordance with some embodiments and associated with the physical view 301 of FIG. 3A. As illustrated, the routing tree of timing view 302 violates both design rules, and sink 352 has an associated timing 355 which is different than the associated timing values 345 for sinks 340-344, and more than two sinks are in the fanout of cell 330. FIG. 3C illustrates a timing view of a simple routing tree with cloned cell in accordance with some embodiments. FIG. 3D illustrates a timing view of a simple routing tree with a delay dependent cloned cell in accordance with some embodiments. Timing view 303 with cloned cells 331-332 grouped without regard to delay results in the fanout of cloned cell 333 violating design rules by having a skew 365 which is not fixable due to the bar on the use of buffering circuit elements to fix the skew in the design rules and cannot be fixed by cell sizing. Timing view 304, however, includes cloned cells 331, 332, 334, and 371, where the fanout of sinks for each cloned cell (e.g. sinks 340-341 for cell 331, sinks 342 and 343 for cell 332, sink 344 for cell 334, and sink 352 for sink 371) are initially grouped by delay, and then fanouts are generated using only sinks within a similar delay grouping. While this results in an increased number of cell clones, the skew within a fanout beneath the clones is addressed. Any further fine-tuning to the skew can be done with cell sizing.

Additionally, as shown in timing view 304, skew between fanouts can be addressed by modifying the cloned cells. Cell 371 can be considered a hybrid cloned cell because it does not exactly match other cloned cells such as cloned cell 330, but are modified to adjust the delay of the fanout. Cell 371 is thus a logical clones of the same cell, but provides a different delay within the associated branch of the routing tree. This allows the sinks below a cloned cell to have their timing tuned together within the delay limits afforded by size adjustments to the cloned cells, even though the individual sinks are not adjustable individually due to the lack of buffer circuitry. In some embodiments this can be done by downsizing or upsizing the cloned cell (e.g. cell 371) to increase or reduce delay (e.g. the more capacitance a gate drives, the more slowly a clock signal will change, so meeting DRVs associated with this change is a constraint that drives cell cloning flow as described herein). Thus, while sink 352 includes a greater delay 355 than the other cells, this can be compensated for with the hybrid cell clone 371 to reduce the delay and bring the overall delay of the sinks within design rules. As described above, rather than increasing the delay of all branches in a clock tree using buffers, this enables certain branches to have a reduced delay to improve performance while achieving design targets within the circuit design.

In the views described above, a simple tree is shown where the ICGs drive one or two sinks. In various embodiments, ICGs can drive subtrees with many sinks in each subtree (e.g. hundreds of sinks per subtree). Thus, in another embodiment, rather than cell 331 driving two sinks 340 and 341 and cell 371 driving sink 352, each of these cells can drive a subtree containing any number of sinks so long as DRVs are met. The embodiments described herein for the simple designs can thus be extended to significantly more complex designs with the values within subtrees shifted using ICG cell cloning to improve the performance of the device by selecting the properties of the individual cloned gates based on the specific details of each subtree.

Figure 4:
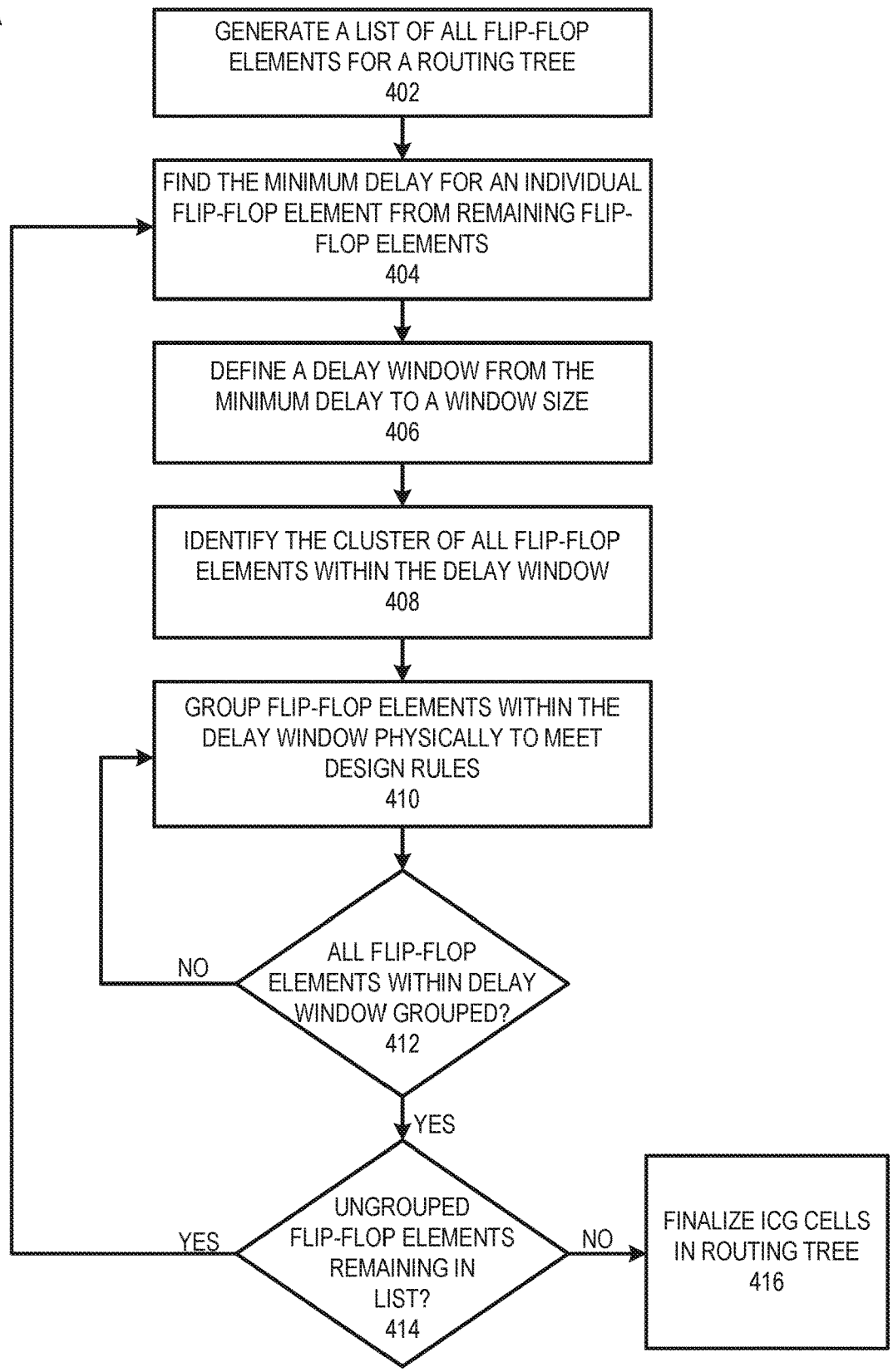
FIG. 4 is a flow diagram for a method of delay dependent physically aware cell cloning in accordance with some embodiments.

FIG. 4 is a flow diagram for a method 400 of delay dependent physically aware cell cloning in accordance with some embodiments. Method 400 describes delay dependent grouping for physically aware cell cloning in an initial circuit design with an identified ICG cell assigned to a large number of flip-flop elements, as described above, where some flip-flop elements have different associated delays (e.g. due to PID) or where there are different transitive delays within a subtree of the routing tree.

In operation 402, an initial list of all flip-flop elements for a routing tree is generated in order to initiate clustering and fanout assignments to meet DRVs for a circuit design. In operation 404, a minimum delay for the flip-flop elements remaining in the list is identified. As groups of flip-flop elements are removed in subsequent iterations, this minimum delay will increase until all flip-flop elements are assigned to a fanout within the design that meets design rules. A delay window is then defined from this minimum delay to a window size. For example, if the minimum delay is −20 ps, and the window size is 10 ps, the delay window will be from −20 ps to −10 ps. In one embodiment, the lower value is included, and the upper value is excluded (e.g. to be used for the next higher delay window in the next iteration). In operation 408, all flip-flop elements having a delay within the identified delay window are clustered as flip-flop elements for that window. Then, in operation 410, flip-flop elements are grouped within fanouts below a single ICG cloned cell circuit to meet design rules. This is, in some embodiments, a sub-operation to group flip-flop elements with similar delays via physical proximity. This sub-grouping is repeated in operation 412 until all flip-flop elements having a delay within the delay window are assigned to a fanout below a particular ICG cell clone. In operation 414, a check is performed to see if all flip-flop elements have been assigned, or if flip-flop elements with a higher delay outside the delay window remain to be grouped.

If so, the process returns to operation 404. The previous flip-flop element with the lowest delay will have been assigned to a fanout, and so will no longer be within the list. The new flip-flop element with the minimum delay will have a delay higher than the highest delay within the previous delay window, since all flip-flop elements within the delay window will have been assigned to a fanout in iterations of operation 410. The next window, for example, could be from −10 ps to 0 ps. Operations 404-414 then repeat until all flip flop elements in the list generated in operation 402 are assigned to a fanout under a particular cell clone, and the ICG cloned cells and the routing tree are then finalized with the design flow proceeding in operation 416.

As described above, one benefit of this approach is that flip-flop elements with similar delays are grouped and can be made to balance within a fanout below an individual ICG cell any offset by buffering or sizing. Balancing between ICG cell clones can be tuned by cell sizing. This reduces power and improves the timing because any useful skew offsets can be implemented in a precise manner without the costs of buffering. While the embodiment above particularly describes an application with ICG cells, other embodiments can apply to other routing trees, or to sub-trees using the transitive delay of each subtree. Similarly, this approach can be extended to level balancing flows to construct very regular trees rather than ones that are explicitly delay balanced. In these flows, the number of stages below each cell in the tree is calculated. Flip-flop elements can be assigned a stage depth 0, and their drivers a stage depth 1. By default, standard CTS operations will gather up all the cells with stage-depth 0 and cluster them together physically, creating the appropriate number of clones. Such an embodiment can then consider the driver of the clones and cluster them together, creating additional clones at the next level. However, this flow has the same problem with useful skew (e.g. if some flip-flop elements have an offset and some don't). Such an embodiment can apply the partitioning algorithm to separate each clustering problem (e.g. the stage-depth 0 problem) into subproblems by again applying a delay window at each subproblem.

FIG. 5 then describes a method 500 of delay dependent physically aware cell cloning in accordance with some embodiments. In some embodiments, method 500 is a method performed by an EDA computing device to generate design files for a circuit design. In some embodiments, method 500 is represented by instructions stored in a memory of an EDA computing device or in a non-transitory computer-readable medium, where the instructions cause the EDA computing device to perform method 500 when executed by one or more processors.

Method 500 begins with operation 502 accessing, using one or more hardware processors, a circuit design stored in memory, the circuit design comprising a plurality of flip-flop elements having clock inputs provided by a routing tree. As described above, this initial circuit design can provide a placeholder for the routing tree that meets design rules, by having an identified cell for cloning along with the sinks (e.g. flip-flop elements) with the eventually drivers and fanouts expected to be set during a delay dependent physically aware cell cloning process implemented using method 500 or similar embodiments. After the circuit design with the design information is accessed, an associated delay for each flip-flop element of the plurality of flip-flop elements is identified in operation 504. This delay from operation 504 is used in clustering the plurality of flip-flop elements by the associated delay to generate at least a first cluster of flip-flop elements and a second cluster of flip-flop elements in operation 506.

The delay based clusters generated in operation 506 are then used in operation 508 for grouping flip-flop elements within the first cluster by physical characteristics to generate at least a first delay group of flip-flop elements within the first cluster and a second delay group of flip-flop elements within the first cluster. The delay based grouping is a first tier of grouping, and then this initial grouping is used for sub-grouping in operation 508 with physical proximity used to group flip-flop elements with similar delay values. An updated routing tree for the circuit design using the first delay group and the second delay group is then generated in operation 510.

Some such embodiments operate with a first timing delay for the first delay group is set by a first size of a first internal clock gate (ICG) circuit used to drive flip flop elements of the first delay group and a second timing delay for the second delay group is set by a second size of a second ICG used to drive flip-flop elements of the second delay group. In such embodiments, the first timing delay and the second timing delay can be adjusted without buffer circuits (e.g. due to a design rule against the use of buffer circuits to improve performance, where a buffer circuit is a circuit elements used to increase delay, as opposed to an ICG cell which can adjust delay but is primarily used for gating as described above).

In some embodiments, the clustering of the plurality of flip-flop elements by the associated delay to generate at least a first cluster of flip-flop elements and a second cluster of flip-flop elements involves: identifying a minimum delay for an individual flip-flop element of the plurality of flip-flip elements, defining a first delay window from the minimum delay to a window size, defining a second delay window from a maximum delay of the first delay window to the window size, generating the first cluster of flip-flop elements as a first set of flip-flop elements of the plurality of flip-flop elements having the associated delay within the first delay window, and generating the second cluster of flip-flop elements as a second set of flip-flop elements of the plurality of flip-flop elements having the associated delay within the second delay window. In other embodiments, various other operations for defining delay windows, including user defined delay windows of specifically user selected sizes, or any other such selection process, can be used.

In various such embodiments, the method 500 can additionally involve defining associated delay windows to group each flip-flop element of the plurality of flip-flop elements within an associated cluster with the associated delay window. Similarly, some embodiments can operate where the window size is selected based on a design rule to limit skew within a fanout for an associated integrated clock gate (ICG) cell used to drive flip-flop elements within each cluster of flip-flop elements, and some such embodiments can operate where the associated ICG cell is downsized to balance the skew between said each cluster of flip-flop elements.

In any such embodiments, the associated delay for at least a first portion of the plurality of flip-flop elements is based on a pin insertion delay (PID) or other useful skew offset, and at least a second portion of the plurality of flip-flop elements have different delay values than delay values for the first portion of the plurality of flip-flop elements.

In some embodiments, the operations proceed after operation 510 with generating or initiating generation of a set of masks from the updated circuit design for use in generating an integrated circuit comprising the updated circuit design. The component arrangement defined and generated in the above operations may then be used to fabricate (e.g., generate) or initiate generation of an integrated circuit using the component arrangement. In various embodiments, various devices, systems, and methods are used to fabricate devices based on the updated circuit design. In some embodiments, this includes generation of masks and the use of machinery for circuit fabrication. In various implementations, files generated by embodiments described herein are used to create photolithographic masks for lithography operations used to generate circuits according to a circuit design, where a pattern defined by the masks is used in applying a thin uniform layer of viscous liquid (photo-resist) on the wafer surface. The photo-resist is hardened by baking and then selectively removed by projection of light through a reticle containing mask information. In some implementations, the files are further used for etching patterning, where unwanted material from the surface of the wafer is removed according to details described in the design files, where a pattern of the photo-resist is transferred to the wafer by means of etching agents. In some embodiments, aspects of design files generated according to the operations described herein are used for deposition operations, where films of the various materials are applied on the wafer. This may involve physical vapor deposition (PVD), chemical vapor deposition (CVD) or any such similar processes. Some embodiments may use files generated according to operations described herein for chemical mechanical polishing, where a chemical slurry with etchant agents is used to planarize to the wafer surface, for oxidation where dry oxidation or wet oxidation molecules convert silicon layers on top of the wafer to silicon dioxide, for ion implantation where dopant impurities are introduced into a semiconductor using a patterned electrical field, or for diffusion where bombardment-induced lattice defects are annealed. Thus, in various embodiments, systems and operations include not only computing devices for generating updated circuit design files, but also hardware systems for fabricating masks, controlling IC fabrication hardware, and the hardware and operations for fabricating a circuit from a circuit design (e.g., component arrangement) generated in accordance with various embodiments described herein.

Additionally, it will be apparent that any apparatus or operations described herein in accordance with various embodiments may be structured with intervening, repeated, or other elements while still remaining within the scope of the contemplated embodiments. Some embodiments may include multiple receivers, along with any other circuit elements. Some embodiments may function with described operating modes as well as other operating modes. The various embodiments described herein are thus presented as examples, and do not exhaustively describe every possible implementation in accordance with the possible embodiments.

Figure 6:
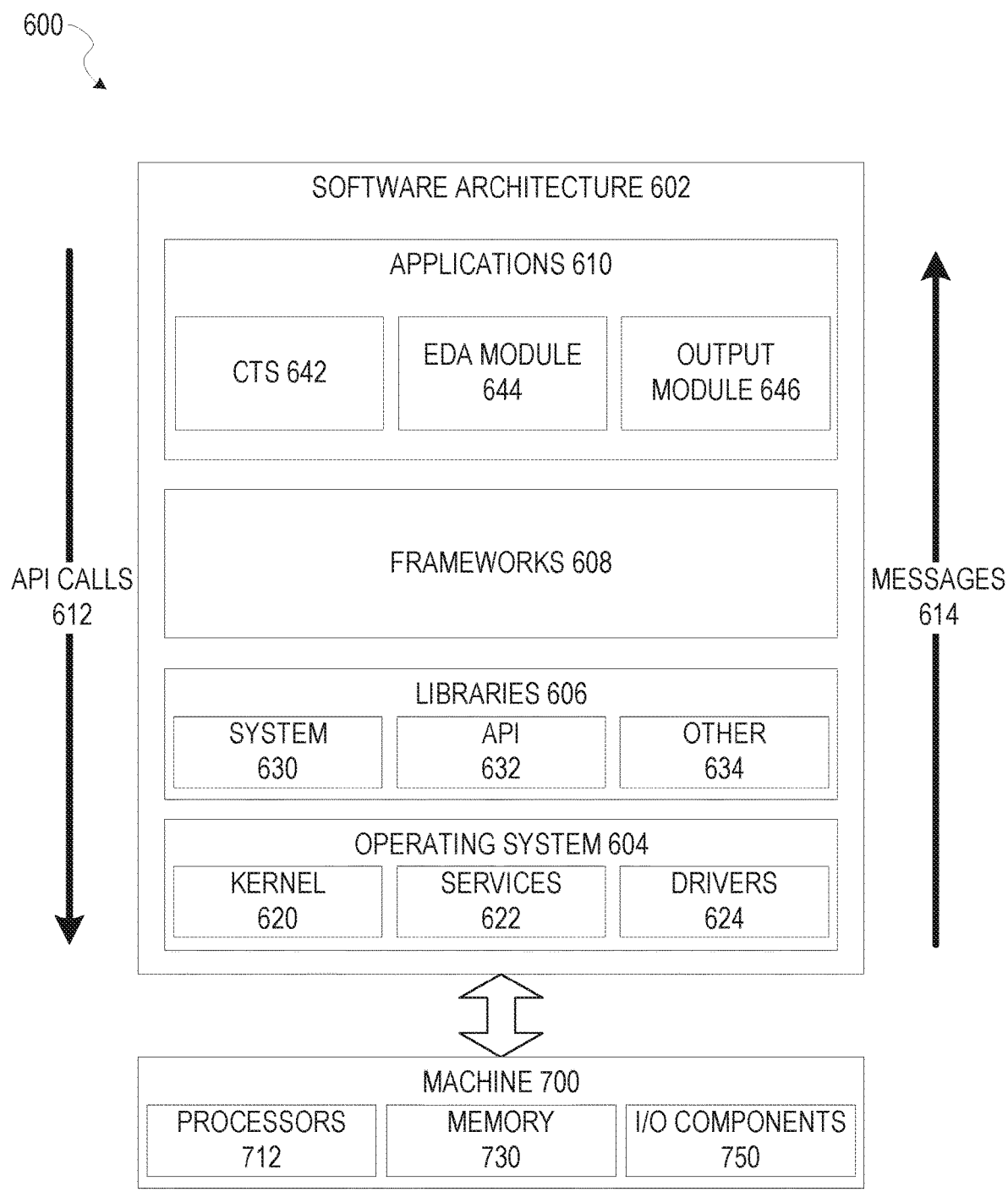
FIG. 6 is a block diagram illustrating an example of a software architecture that may be operating on an EDA computer and used with methods for routing tree generation to update a circuit design, according to some example embodiments.

FIG. 6 is a block diagram 600 illustrating an example of a software architecture 602 that may be operating on an EDA computer and used with methods for modifying a balanced clock structure, according to some example embodiments. Software architecture 602 can be used as an electronic design automation computing device to implement any of the methods described above. Aspects of software architecture 602 may, in various embodiments, be used to store circuit designs and execute timing analysis or optimization in an EDA environment to generate circuit designs, with physical devices generated using these circuit designs.

FIG. 6 non-limiting example of a software architecture 6 602, and it will be appreciated that many other architectures can be implemented to facilitate the functionality described herein. In various embodiments, the software architecture 602 is implemented by hardware such as machine 700 that includes processors 710, memory 730, and input/output (IO) components 750. In this example, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke application programming interface (API) calls 612 through the software stack and receive messages 614 in response to the API calls 612, consistent with some embodiments. In various embodiments, any client device, server computer of a server system, or any other device described herein may operate using elements of software architecture 602. An EDA computing device described herein may additionally be implemented using aspects of the software architecture 602, with the architecture 602 adapted for operating to perform clock synthesis and modification of balanced clock structures in accordance with embodiments herein.

In one embodiment, an EDA application of applications 610 performs routing tree generation and/or adjustments, according to embodiments described herein, using various modules within software architecture 602. For example, in one embodiment, an EDA computing device similar to machine 700 includes memory 730 and one or more processors 710. The processors 710 implement a clock tree synthesis module 642 to improve routing tree synthesis in some embodiments. The processors 710 also implement additional EDA module(s) 644 to implement various circuit design operations. The design is finalized by an output module 646 if the criteria/design thresholds are met.

In some embodiments, processor-implemented output module 646 may then be used to update a display of I/O components 750 of the EDA computing device with data associated with the updated routing tree generated by the process.

In various other embodiments, rather than being implemented as modules of one or more applications 610, some or all of modules 642, 644, and 646 may be implemented using elements of libraries 606 or operating system 604.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, signal processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 630 such as libraries of multi-instance blocks for use in an EDA environment or other libraries that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 606 may also include other libraries 634.

The software frameworks 608 provide a high-level common infrastructure that can be utilized by the applications 610, according to some embodiments. For example, the software frameworks 608 provide various graphic user interface (GUI) functions, high-level resource management, high-level location services, and so forth. The software frameworks 608 can provide a broad spectrum of other APIs that can be utilized by the applications 610, some of which may be specific to a particular operating system 604 or platform. In various embodiments, the systems, methods, devices, and instructions described herein may use various files, macros, libraries, and other elements of an EDA design environment to implement analysis described herein. This includes analysis of input design files for an integrated circuit design, along with any element for routing tree synthesis, testing, and design updating that may be used as part of or along with the embodiments described herein. While netlist files, library files, SDC files and view definition files are examples that may operate within a software architecture 602, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 700 including processors 710), with these operations being accessible via a network (e.g., the Internet) and via one or more appropriate interfaces (e.g., an API). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine 700, but deployed across a number of machines 700. In some example embodiments, the processors 710 or processor-implemented modules are located in a single geographic location (e.g., within a home environment, an office environment, or a server farm). In other example embodiments, the processors 710 or processor-implemented modules are distributed across a number of geographic locations.

Figure 7:
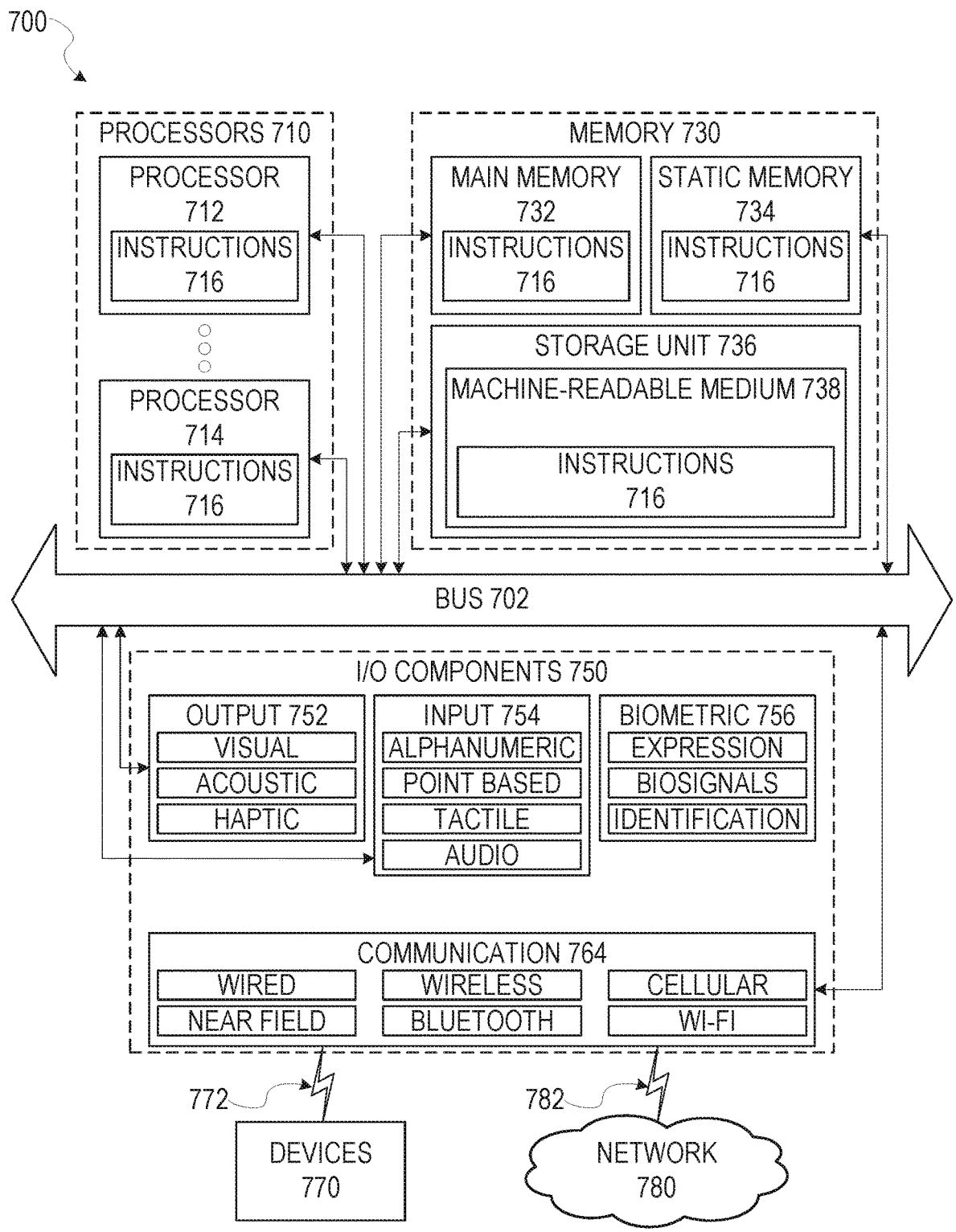
FIG. 7 is a diagrammatic representation of a machine in the form of a computer system within which a set of instructions are executed, causing the machine to perform any one or more of the methodologies discussed herein, according to some example embodiments.

FIG. 7 is a diagrammatic representation of the machine 700 in the form of a computer system within which a set of instructions may be executed for causing the machine 700 to perform any one or more of the methodologies discussed herein, according to an example embodiment. FIG. 7 shows components of the machine 700, which is, according to some embodiments, able to read instructions from a machine-readable medium (e.g., a machine-readable storage medium) and perform any one or more of the methodologies discussed herein. In some embodiments, the machine 700 may operate with instructions 716 (e.g., software, a program, an application, an applet, an app, or other executable code) for causing the machine 700 to perform any one or more of the methodologies discussed. In alternative embodiments, the machine 700 operates as a standalone device or can be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a set-top box (STB), a personal digital assistant (PDA), a media system, a cellular telephone, a smart phone, a mobile device, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710

(e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 712 and a processor 714 that may execute the instructions 716. The term "processor" is intended to include multi-core processors 710 that may comprise two or more independent processors 712, 714 (also referred to as "cores") that can execute instructions 716 contemporaneously. Although FIG. 7 shows multiple processors 710, the machine 700 may include a single processor 712 with a single core, a single processor 712 with multiple cores (e.g., a multi-core processor 712), multiple processors 710 with a single core, multiple processors 710 with multiples cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown, in an example embodiment, to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow 100, or outputs for circuit fabrication. In various embodiments, outputs of a timing analysis are used to generate updates and changes to a circuit design, and after a final closure of timing with all associated timing thresholds and design requirements met, circuit design output files are used to generate masks and other physical outputs for generation of a circuit. As described herein, "requirements," "design elements," and other aspects of a circuit design refer to selectable values that are set as part of the design of a circuit. Such design requirements or elements may be adjusted by a system operator or circuit designer to suit the particular goals of a project or circuit that results from the operations described herein.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, communication components 764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 770 may be another machine or any of a wide variety of peripheral devices (e.g., a peripheral device coupled via a USB).

Transmission Medium

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-speed Packet Access (HSPA), Worldwide Interoperability for Microwave Access (WiMAX), Long Term Evolution (LTE) standard, others defined by various standard-setting organizations, other long range protocols, or other data transfer technology.

Furthermore, the machine-readable medium 738 is non-transitory (in other words, not having any transitory signals) in that it does not embody a propagating signal. However, labeling the machine-readable medium 738 "non-transitory" should not be construed to mean that the medium 738 is incapable of movement, the medium 738 should be considered as being transportable from one physical location to another. Additionally, since the machine-readable medium 738 is tangible, the medium 738 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, techniques, instruction sequences, and computing machine program products that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A computer-implemented method comprising:
   accessing, using one or more hardware processors, a circuit design stored in memory, the circuit design comprising a plurality of flip-flop elements having clock inputs provided by a routing tree;
   identifying, using the one or more hardware processors, an associated delay for each flip-flop element of the plurality of flip-flop elements;
   clustering, using the one or more hardware processors, individual flip-flop elements within the plurality of flip-flop elements based on the associated delays of the individual flip-flop elements to generate at least a first cluster of flip-flop elements and a second cluster of flip-flop elements, the clustering comprising:
      identifying a minimum delay for an individual flip-flop element of the plurality of flip-flip elements;
      defining a first delay window from the minimum delay to a window size:
      defining a second delay window from a maximum delay of the first delay window to the window size;
      generating the first cluster of flip-flop elements as a first set of flip-flop elements of the plurality of flip-flop elements having the associated delay within the first delay window; and
      generating the second cluster of flip-flop elements as a second set of flip-flop elements of the plurality of flip-flop elements having the associated delay within the second delay window;
   grouping, using the one or more hardware processors, single flip-flop elements within the first cluster based on physical characteristics of the single flip-flop elements to generate at least a first delay group of flip-flop elements within the first cluster and a second delay group of flip-flop elements within the first cluster;
   generating, using the one or more hardware processors, an updated circuit design by updating the routing tree for the circuit design using the first delay group and the second delay group; and
   generating, using the one or more hardware processors, a set of masks based on the updated circuit design, the set of masks being configured for use in generating an integrated circuit that comprises the updated circuit design.

2. The computer-implemented method of claim 1, wherein a first timing delay for the first delay group is set by a first size of a first internal clock gate (ICG) circuit used to drive flip flop elements of the first delay group; and
wherein a second timing delay for the second delay group is set by a second size of a second ICG used to drive flip-flop elements of the second delay group.

3. The computer-implemented method of claim 1,
wherein a first timing delay for the first delay group is set by a first level shifter circuit for the first delay group;
wherein a second timing delay for the second delay group is set by a second level shifter circuit for the second delay group;
wherein the first timing delay and the second timing delay are adjusted without buffer circuits.

4. The computer-implemented method of claim 1, comprising:
defining associated delay windows to group each flip-flop element of the plurality of flip-flop elements within an associated cluster with the associated delay window.

5. The computer-implemented method of claim 1, wherein the window size is selected based on a design rule to limit skew within a fanout for an associated integrated clock gate (ICG) cell used to drive flip-flop elements within each cluster of flip-flop elements.

6. The computer-implemented method of claim 5, herein the associated ICG cell is downsized to balance the skew between the each cluster of flip-flop elements.

7. The computer-implemented method of claim 1, wherein the associated delay for at least a first portion of the plurality of flip-flop elements is based at least in part on a pin insertion delay (PID) or skew offset values for the plurality of flip-flops; and
wherein at least a second portion of the plurality of flip-flop elements have different delay values than delay values for the first portion of the plurality of flip-flop elements.

8. A device comprising:
a memory configured to store a circuit design; and
one or more processors coupled to the memory and configured to perform operations comprising:
accessing the circuit design from the memory, the circuit design comprising a plurality of flip-flop elements having clock inputs provided by a routing tree;
identifying an associated delay for each flip-flop element of the plurality of flip-flop elements;
clustering individual flip-flop elements within the plurality of flip-flop elements based on the associated delays of the individual flip-flop elements to generate at least a first cluster of flip-flop elements and a second cluster of flip-flop elements, the clustering comprising:
identifying a minimum delay for an individual flip-flop element of the plurality of flip-flip elements;
defining a first delay window from the minimum delay to a window size;
defining a second delay window from a maximum delay of the first delay window to the window size;
generating the first cluster of flip-flop elements as a first set of flip-flop elements of the plurality of flip-flop elements having the associated delay within the first delay window; and
generating the second cluster of flip-flop elements as a second set of flip-flop elements of the plurality of flip-flop elements having the associated delay within the second delay window;
grouping single flip-flop elements within the first cluster based on physical characteristics of the single flip-flop elements to generate at least a first delay group of flip-flop elements within the first cluster and a second delay group of flip-flop elements within the first cluster;
generating an updated circuit design by updating the routing tree for the circuit design using the first delay group and the second delay group; and
generating a set of masks based on the updated circuit design, the set of masks being configured for use in generating an integrated circuit that comprises the updated circuit design.

9. The device of claim 8, wherein a first timing delay for the first delay group is set by a first size of a first internal clock gate (ICG) circuit used to drive flip flop elements of the first delay group; and
wherein a second timing delay for the second delay group is set by a second size of a second ICG used to drive flip-flop elements of the second delay group.

10. The device of claim 8,
wherein a first timing delay for the first delay group is set by a first level shifter circuit for the first delay group;
wherein a second timing delay for the second delay group is set by a second level shifter circuit for the second delay group;
wherein the first timing delay and the second timing delay are adjusted without buffer circuits.

11. The device of claim 8, wherein the operations comprise:
defining associated delay windows to group each flip-flop element of the plurality of flip-flop elements within an associated cluster with the associated delay window.

12. The device of claim 8, wherein the window size is selected based on a design rule to limit skew within a fanout for an associated integrated clock gate (ICG) cell used to drive flip-flop elements within each cluster of flip-flop elements.

13. The device of claim 12, wherein the associated ICG cell is downsized to balance the skew between the each cluster of flip-flop elements.

14. The device of claim 8, wherein the associated delay for at least a first portion of the plurality of flip-flop elements is based at least in part on a pin insertion delay (PID) or skew offset values for the plurality of flip-flops; and
wherein at least a second portion of the plurality of flip-flop elements have different delay values than delay values for the first portion of the plurality of flip-flop elements.

15. A non-transitory computer-readable medium comprising instructions that, when executed by one or more processors of an electronic design automation (EDA) computing device, cause the device to perform operations comprising:
accessing a circuit design stored in memory, the circuit design comprising a plurality of flip-flop elements having clock inputs provided by a routing tree;
identifying an associated delay for each flip-flop element of the plurality of flip-flop elements;
clustering individual flip-flop elements within the plurality of flip-flop elements based on the associated delays of the individual flip-flop elements to generate at least a first cluster of flip-flop elements and a second cluster of flip-flop elements, the clustering comprising:
  identifying a minimum delay for an individual flip-flop element of the plurality of flip-flip elements;
  defining a first delay window from the minimum delay to a window size;
  defining a second delay window from a maximum delay of the first delay window to the window size;
  generating the first cluster of flip-flop elements as a first set of flip-flop elements of the plurality of flip-flop elements having the associated delay within the first delay window; and
  generating the second cluster of flip-flop elements as a second set of flip-flop elements of the plurality of flip-flop elements having the associated delay within the second delay window;
grouping single flip-flop elements within the first cluster based on physical characteristics of the single flip-flop elements to generate at least a first delay group of flip-flop elements within the first cluster and a second delay group of flip-flop elements within the first cluster;
generating an updated circuit design by updating the routing tree for the circuit design using the first delay group and the second delay group; and
generating a set of masks based on the updated circuit design, the set of masks being configured for use in generating an integrated circuit that comprises the updated circuit design.

16. The non-transitory computer readable medium of claim 15, wherein a first timing delay for the first delay group is set by a first size of a first internal clock gate (ICG) circuit used to drive flip flop elements of the first delay group; and
  wherein a second timing delay for the second delay group is set by a second size of a second ICG used to drive flip-flop elements of the second delay group.

17. The non-transitory computer readable medium of claim 15,
  wherein a first timing delay for the first delay group is set by a first level shifter circuit for the first delay group;
  wherein a second timing delay for the second delay group is set by a second level shifter circuit for the second delay group;
  wherein the first timing delay and the second timing delay are adjusted without buffer circuits.

18. The non-transitory computer readable medium of claim 15, wherein the operations comprise:
  defining associated delay windows to group each flip-flop element of the plurality of flip-flop elements within an associated cluster with the associated delay window.

19. The non-transitory computer readable medium of claim 15, wherein the window size is selected based on a design rule to limit skew within a fanout for an associated integrated clock gate (ICG) cell used to drive flip-flop elements within each cluster of flip-flop elements.

20. The non-transitory computer readable medium of claim 19, wherein the associated ICG cell is downsized to balance the skew between the each cluster of flip-flop elements.

* * * * *